(12) United States Patent
Goldstein

(10) Patent No.: US 10,440,176 B2
(45) Date of Patent: *Oct. 8, 2019

(54) REAL-TIME VOICE PAGING VOICE AUGMENTED CALLER ID/RING TONE ALIAS

(71) Applicant: Staton Techiya, LLC, Delray Beach, FL (US)

(72) Inventor: Steven Wayne Goldstein, Delray Beach, FL (US)

(73) Assignee: Staton Techiya, LLC, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,632

(22) Filed: Oct. 27, 2015

(65) Prior Publication Data

US 2016/0050311 A1 Feb. 18, 2016
US 2019/0253552 A9 Aug. 15, 2019

Related U.S. Application Data

(63) Continuation of application No. 14/511,154, filed on Oct. 9, 2014, now Pat. No. 9,172,794, which is a continuation of application No. 14/493,270, filed on Sep. 22, 2014, now Pat. No. 9,167,082, which is a continuation of application No. 14/886,133, filed on
(Continued)

(51) Int. Cl.
*H04M 1/56* (2006.01)
*H04M 15/06* (2006.01)
*H04M 1/00* (2006.01)
*H04M 3/42* (2006.01)
*H04W 4/12* (2009.01)
*H04M 1/725* (2006.01)
*H04M 1/57* (2006.01)
(Continued)

(52) U.S. Cl.
CPC ....... *H04M 3/42051* (2013.01); *H04M 1/576* (2013.01); *H04M 1/7255* (2013.01); *H04M 1/72555* (2013.01); *H04M 3/42059* (2013.01); *H04N 7/141* (2013.01); *H04W 4/12* (2013.01); *H04M 1/57* (2013.01); *H04W 88/02* (2013.01)

(58) Field of Classification Search
CPC .... H04M 3/42017; H04M 3/02; H04M 1/578; H04M 1/57; H04M 19/04; H04M 19/041
USPC ............ 379/142.01, 142.06, 142.14, 373.01, 379/373.04, 374.02
See application file for complete search history.

(56) References Cited

U.S. PATENT DOCUMENTS 6,044,148 A 3/2000 Bleile
6,580,784 B2 * 6/2003 Rodriguez ............ H04M 1/658
379/142.06

(Continued)

*Primary Examiner* — Quoc D Tran
(74) *Attorney, Agent, or Firm* — Akerman LLP; Peter A. Chiabotti; Mammen (Roy) P. Zachariah, Jr.

(57) ABSTRACT

A communication device and method can include one or more processors operatively coupled to memory and an audible output device, where the one or more processors receive a call from a calling party that includes caller identification information and a voice paging message associated with the caller identification information, presenting the caller identification information, presenting the voice paging message as an alias of or to a ring tone or interleaved with the ring tone before the call from the calling party is answered or rejected. Other embodiments are disclosed.

20 Claims, 8 Drawing Sheets

100
Telephone Call with Ring Tone Voice Alias

Related U.S. Application Data

Oct. 19, 2015, now Pat. No. 9,578,164, which is a continuation of application No. 14/493,270, filed on Sep. 22, 2014, now Pat. No. 9,167,082.

(60) Provisional application No. 61/880,963, filed on Sep. 22, 2013, provisional application No. 61/889,002, filed on Oct. 9, 2013.

(51) Int. Cl.
*H04N 7/14* (2006.01)
*H04W 88/02* (2009.01)

(56) References Cited

U.S. PATENT DOCUMENTS

| | | | |
|---|---|---|---|
| 6,590,965 B1 | 7/2003 | Poole et al. | |
| 6,697,470 B2* | 2/2004 | McDonough | H04M 19/041 379/142.01 |
| 6,748,058 B1 | 6/2004 | Schwend et al. | |
| 6,766,004 B1 | 7/2004 | Chiloyan | |
| 6,944,277 B1 | 9/2005 | Vikki | |
| 6,970,906 B1 | 11/2005 | Parsons et al. | |
| 7,162,027 B1 | 1/2007 | Cannon et al. | |
| 8,073,121 B2 | 12/2011 | Urban et al. | |
| 8,391,445 B2 | 3/2013 | Hoblit et al. | |
| 8,494,125 B2 | 7/2013 | Burg et al. | |
| 9,172,794 B2* | 10/2015 | Goldstein | H04M 3/42051 |
| 2002/0172338 A1 | 11/2002 | Lee et al. | |
| 2003/0032415 A1 | 2/2003 | Cho et al. | |
| 2003/0086558 A1 | 5/2003 | Seelig et al. | |
| 2004/0258220 A1 | 12/2004 | Levine et al. | |
| 2005/0143103 A1* | 6/2005 | Bjorgan | H04M 3/42051 455/466 |
| 2006/0088153 A1* | 4/2006 | Wille | H04M 19/04 379/373.01 |
| 2006/0148459 A1* | 7/2006 | Wolfman | H04M 1/57 455/415 |
| 2007/0140219 A1 | 6/2007 | Diroo et al. | |
| 2007/0230678 A1* | 10/2007 | Bloebaum | H04M 3/02 379/211.01 |
| 2007/0297587 A1* | 12/2007 | Urban | H04L 47/10 379/142.17 |
| 2008/0298570 A1* | 12/2008 | Wang | H04M 1/578 379/142.01 |
| 2009/0089716 A1 | 4/2009 | Chen et al. | |
| 2009/0310766 A1* | 12/2009 | Ye | H04M 3/42017 379/142.17 |
| 2011/0123007 A1* | 5/2011 | Cotignola | H04M 3/02 379/93.01 |
| 2011/0219018 A1 | 9/2011 | Bailey et al. | |
| 2014/0057612 A1* | 2/2014 | Du Bourg De Luzencon | H04M 1/57 455/415 |

* cited by examiner

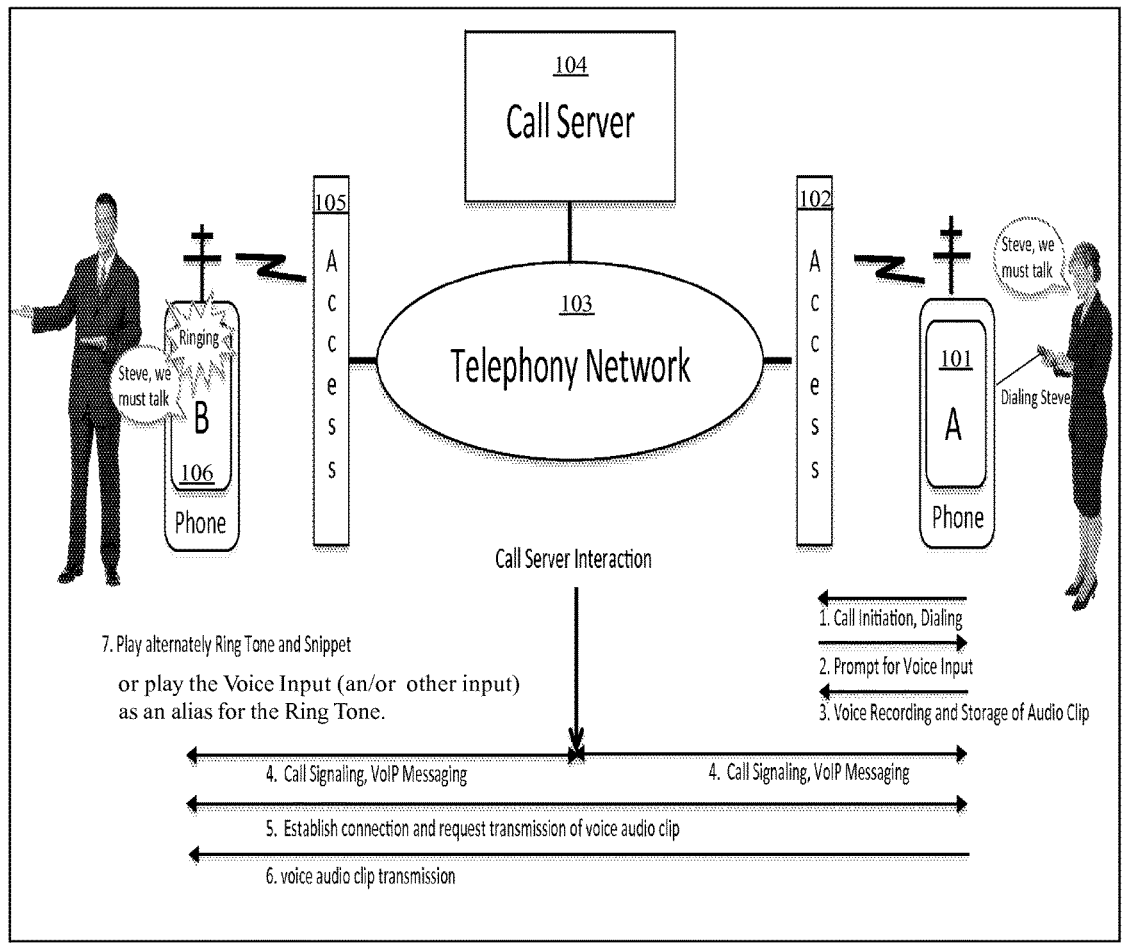
Figure 1: Telephone Call with Ring Tone Voice Alias

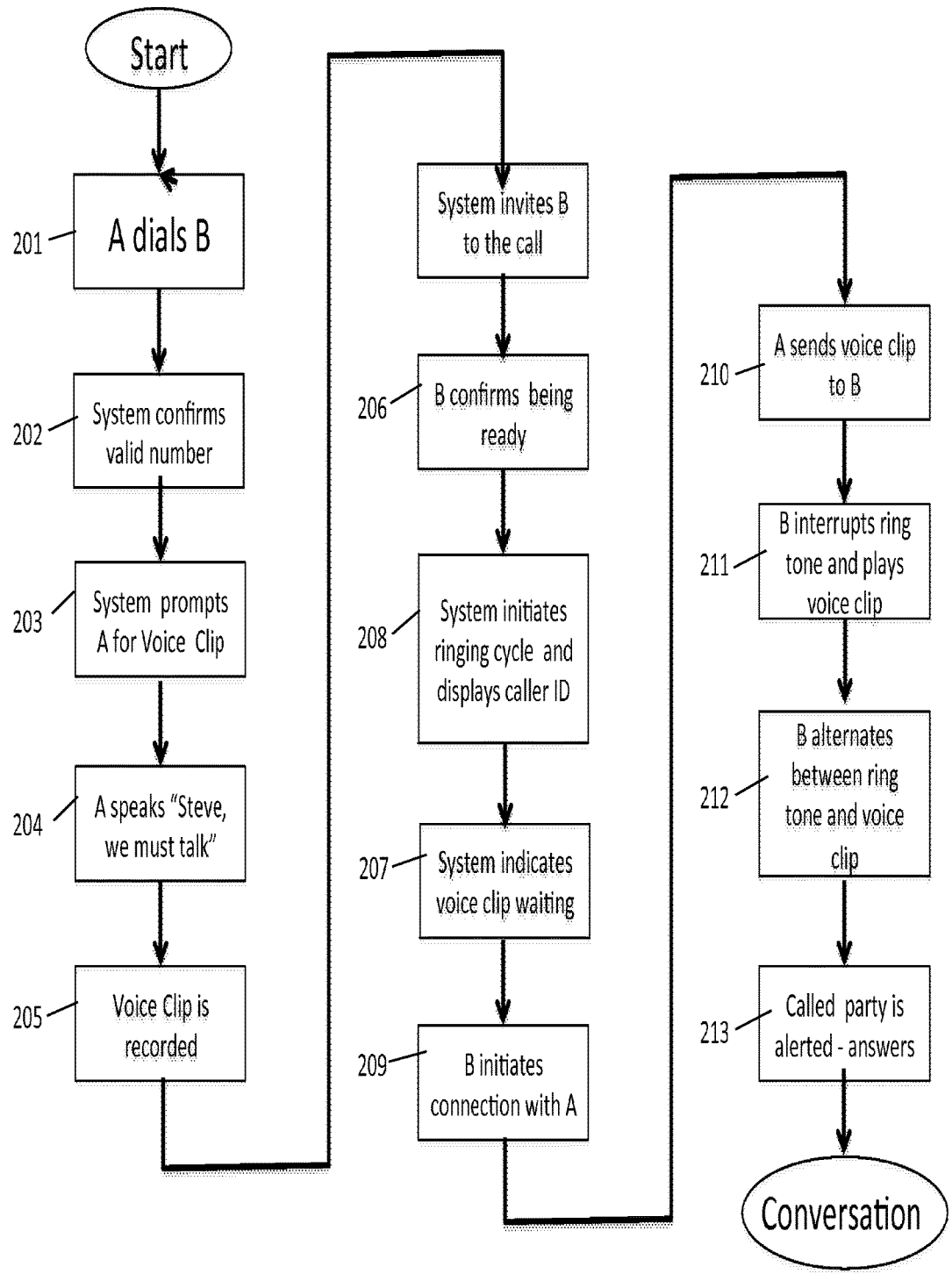
Figure 2: Example Call Flow as illustrated in Fig. 1

Voice and Signal Paths

300

320

330

400

500

600

700

800

US 10,440,176 B2

REAL-TIME VOICE PAGING VOICE AUGMENTED CALLER ID/RING TONE ALIAS

CROSS REFERENCE TO RELATED APPLICATIONS

This application is an continuation of U.S. application Ser. No. 14/511,154 filed on Oct. 9, 2014, which is a utility patent application that claims the priority benefit of Provisional Patent Application No. 61/889,002 entitled "Real-Time Voice Paging Voice Augmented Caller ID/Ring Tone Alias" filed on 9 Oct. 2013, the entire contents of which are incorporated herein by reference in their entirety. The application also claims priority benefit of U.S. patent application Ser. No. 14/886,133 filed on Oct. 19, 2015 which is a continuation of U.S. patent application Ser. No. 14/493,270, now U.S. Pat. No. 9,167,082 entitled Methods and Systems for Voice Augmented Caller ID/Ring Tone Alias filed on 22 Sep. 2014 which claims the priority benefit of Provisional Patent Application No. 61/880,963 entitled "Methods and Systems for Voice Augmented Caller ID/Ring Tone Alias" filed on 22 Sep. 2013, the entire contents of which are all incorporated herein by reference in their entirety.

FIELD

The embodiments herein generally disclose methods and systems for caller identification in modern communications technologies. Application of the embodiments can apply to all forms mobile and non-mobile forms of communications devices including wearable and body-borne computing. Some embodiments incorporate voice or audio clips in the caller identification procedure during a call setup of a telephone call. Some embodiments incorporate real-time voice paging voice augmented caller ID as a ring tone alias.

BACKGROUND

Speech signals include information about the creator of the speech. It is well researched that humans can identify individuals from their voice, suggesting providing the existence of a perceptual representation of voice identity. The spoken word contains information about: who is calling as well as the emotional state of the speaker; it can signal happiness, dissatisfaction, urgency, anger, stress, and many more conditions reflective of the state of mind of the speaker. Additionally gender, age, ethnicity and nationality can also be discovered by one's voice.

BRIEF DESCRIPTION OF THE FIGURES

The embodiment and the following detailed description of certain embodiments thereof may be understood by reference to the following figures:

FIG. 1 depicts a network scenario of party A (the calling party) calling party B (the called party) and submitting a voice audio clip to be played at the B party device during the ringing cycle in accordance with the embodiments;

FIG. 2 depicts the action and call flow for the illustration in FIG. 1 in accordance with the embodiments;

DETAILED DESCRIPTION

Figure 3A:
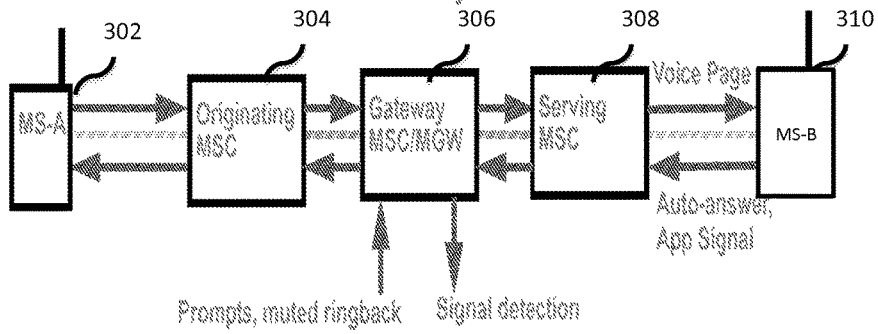
FIG. 3a depicts the voice and signaling paths for a gateway circuit method in accordance with an embodiment.

In today's telephony communication systems information about who is calling as well as the emotional state of the speaker as well as gender, age, ethnicity and nationality is not available to the recipient (called party) of a phone call during the call setup phase (telephony signaling protocol terminology), that is during the ringing phase of the arriving call before the call is answered.

If a voice or speech or audio clip of the calling party were presented during the ringing phase, the called party would be able to potentially identify and recognize a speaker from memory who is calling and obtain an impression of the caller's state of mind or the potential subject matter of the upcoming call and therefore be able to make a better-educated decision whether to answer the call. For example, consider a case whereby the called party is engaged in a business meeting and a call arrives from his or her spouse, a few seconds of a calling party's voice could reflect a possible stress situation of the spouse that would require the immediate attention of the called party. Conceivably there are many other situations where the receiving party (recipient or called party) could benefit from hearing a voice sample of the calling party without the need to look at or to touch the communication device before the call is actually answered.

Referring to FIG. 1, a system 100 in accordance with an embodiment can initiate a call from Party A to Party B using a calling party's phone or device 101 to dial and initiate a call to the called party's device 106. The device 101, for example, can connect to the device 106 via an access point 102 within range of the device 101, a telephony network 103 using a call server 104, and an access point 105 within range of the device 106. The telephony network, access points, and devices can be part of a wired system, a wireless system or a combination of both. The interaction at the call server 104 in such an example can include: 1) receiving the call initiation as a result of the calling party dialing the called party's phone number; 2) sending a prompt to the calling party for a voice input (or other input such as a picture or video of the calling party); 3) recording and storing of the voice input (and/or other input); 4) providing call signaling to one or both of the called party and calling party; 5) establishing a connection and requesting transmission of a voice input or audio clip (and/or other input); 6) transmitting the voice input (and/or other input) to the called party's device 106; and 7) playing the voice input (and/or other input) at the called party's device as an alias for a ring tone or play the voice input (and/or other input) alternately with the ring tone until the called party answer's their device (106) or rejects the call.

Furthermore, the calling party could transmit a still photo or video to the called party instead of or in addition to the voice clip.

Most telephony service providers today offer caller-ID services for telephone users. These services enable a user to identify the name and/or the phone number of the caller before choosing to accept the call. It would be a significant enhancement to the telephone communications functionality if the presented caller-ID were either accompanied by a voice audio clip of the caller and played by acoustic transducers at the called party's communication device as an alias for the ring tone or interleaved with the ringing tone before the called party answers the call. Further note, in some embodiments, the message (whether voice or video) can be recorded at the time of the call origination. In some embodiment, the message (voice or video) can be pre-recorded at some point before the call origination. In yet another embodiment, the voice message or video message can be captured and presented live or virtually live and presented live to the called party. In any event, the voice or video message in some embodiments is "obtained" or retrieved or selected at the time of the call origination. In other words, "obtaining" the voice or video message means that the message is being currently retrieved from a previous recording, obtained from a current recording, or currently streamed to the called party.

Caller identification is a telephony feature that is widely deployed by telephony service providers. The call feature server or telephony switching system obtains and sends the caller identification (of the calling party) to the call receiving device (called party) during the call setup and ringing phase and is subsequently displayed on the communication device of the called party. In particular mobile phones have the ability and are programmed to receive the caller ID in form of a protocol message and display the calling name and number during the ringing cycle. This is standard behavior for today's generation of mobile phones or cell phones, which are connected over a Radio Access Network (RAN) or via VoIP protocols. The call server or switching system delivers the caller ID information either by encoding the information in a VOiP protocol, or over the RAN protocol. The mobile device upon receiving the caller ID information includes the data in the call announcing screen during the ringing cycle.

Some embodiments herein create an opportunity for the calling party to obtain a voice audio clip that is transported over the telephony network or internet to the called party during the call setup phase and which is replayed at the called party's device as a stand alone ring tone alias or interleaved with the ring tone of the incoming call. The microphone built into a phone or other enables the typical capture of the voice clip.

In another embodiment, the calling party hears an audible ring-back tone and then (experiences) what they perceive as their call being answered, and thus begins to speak. During the initial speaking phase, the calling party's audio (captured by a microphone at the calling party's device, for example) is actually being played back to the called party device even thought the called party hasn't yet physically answered their phone. The called party can either choose to answer the phone and engage/continue the conversation, or ignore the calling party's message. If answered, the calling party and optionally the called party would receive an indicator that the live voice conversation is ready to ensue and then the live conversation between the calling party and called party would ensue. The indicator that the live voice conversation is ready can be a text message, iconic symbol, a light, a tactile alert or an auditory signal indicative of the live message.

In another embodiment, the calling party could hear a message and or unique sound or other form of indicator (as described above including text, iconic, light, tactile, auditory, etc.) advising them that the called party's phone is playing their audio but that the called party hasn't accepted the calling party's call.

In another embodiment, the calling party audio clip could be sent to an earphone thus allowing the called party to discreetly audition the calling party's voice clip.

In another embodiment, the calling party may use this feature to convey a short message to remind, or otherwise covey to the called party an action that should or shouldn't take place. In one example, a child could simply verbalize to their parent or other caregiver/friend that they are going to a friend's house after school. In this scenario, the called party could hear the child's voice and decide if they need to take action or not. In a manner, this service operates as an alert with personalized information incorporated into in. The personalized information could be audio, photo, video or text. In other words, the calling party can modify the ring tone heard by the called party. This modification could comprise replaying a voice message played by the calling party.

In another embodiment, the calling party would hear or otherwise be texted a message confirming that their voice/audio message was played (auditioned) and otherwise that the called party was available and/or on the called party's device.

In another embodiment, the calling party could utilize speech, voice or other forms of audio to be sent over an email system, which are then played automatically on the recipient's phone.

In another embodiment, the calling party could utilize speech, voice or other forms of audio to be sent over a text system, which are then played automatically on the recipient's phone.

In another embodiment, a photo or video clip that the calling party posts, is presented during the ringing phase as an alias of the ring tone, and the called party would then be able to potentially identify and recognize the calling party from the still photo or video clip and therefore be able to make a better-educated decision whether to answer the call.

In another embodiment, depending on the characteristics of the caller ID, the call can be automatically rejected, or routed to a different number (including answer message associated with this class of caller ID). Examples of characteristics that can be analyzed from the voice or video message (and/or caller ID if a pre-existing profile or retrievable profile exists) include: age, nationality, ethnicity, or temperament, of the calling party. Methods, systems, and apparatus, including computer programs encoded on a computer storage medium, are described for collecting, transporting and replaying a voice audio clip of a caller obtained (retrieved or recorded or streamed to) at the time of initiating a telephone call, at the called party's communication device interleaved with the ring tone and in addition to displaying caller-ID. Note, the embodiments herein are distinguishable from retrieving pictures or other data stored in association with a called party's phonebook or contact book when detecting a caller ID.

In some embodiments, the method can be realized for packet switching systems or circuit switching systems or both packet and circuit switching systems.

In an embodiment and referring to FIG. 2, after the caller or calling party A dials the called party B at 201 and the system confirms party B's number as a valid number at step 202, the calling party is prompted during the call setup phase to submit a brief voice audio clip directed to the called party at step 203. The calling party provides an input (e.g., "Steve, we must talk") at 204 and the voice audio clip is recorded and stored by the originating device at step 205. The system can invite the called party to the call and the called party can confirm being ready at 206. At the point of the call setup procedure, when the called party device is instructed to apply ringing (at step 208), a new indication in the ringing message (at step 207) will inform the called party device that a voice package is waiting for delivery. The called party device then may establish a speech connection (at step 209) with the calling party device, which is used to transport the voice audio clip to the called party device (at step 210). The receiving device then may interrupt the ring tone and play the voice clip as an alias for the ring tone at step 211 or alternatively interleave the ringing tone with the voice content of the transported voice audio clip and play the voice content over the devices speaker system (at step 212). At 213, the called party is alerted and can optionally answer before a phone conversation ensues.

In some embodiments, the voice audio clip may be obtained through a 2-stage call initiation procedure and stored in computer storage memory of the switching system or one of its dedicated storage systems. This specifically applies to scenarios where the originating device lacks intelligence or memory for storing a voice audio clip.

In some embodiments, the voice audio clip may be encoded in telephony messages and protocols and transported to the called device as part of the call setup procedure, and be replayed by the receiving device during the ringing cycle interleaved with the ringing tone in addition to the caller ID notification display. The voice audio clip may be replayed either before or during the ringing cycle.

In an embodiment, a method includes modification of the telephony call setup protocols comprising:
a) Notification of the called party that in addition to applying ringing a voice packet is waiting for retrieval (207).
b) Establishing a transport connection for the voice audio clip (209).
c) Establishing a session with the caller of a phone call to obtain and store the voice audio clip in computer memory (203).

In an embodiment, a method includes identifying a caller associated with an incoming call from an originating telecommunications device and displaying the calling number and/or name at the called device.

Methods and systems disclosed herein provide for a telephony protocol expansion to include the collection, transport, and delivery of a callers voice audio clip to the called party interleaved with the ring tone.

The features of the embodiments, which are believed to be novel, are set forth with particularity in the appended claims. The embodiments may best be understood by reference to the following description, taken in conjunction with the accompanying drawings.

While the specification concludes with the claims defining the features of the invention that are regarded as novel, it is believed that the embodiments may be better understood from a consideration of the following description in conjunction with the drawings figures, in which like reference numerals are carried forward.

The terms and phrases used herein are not intended to be limiting but rather to provide an understandable description of the invention.

The terms "a" or "an", as used herein, are defied as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

As described above, FIG. 1 illustrates one exemplary embodiment of the system for obtaining, storing, transporting, and replaying audio clips at the called device of a telephone call. Calling party A dials called party B and provides a voice audio clip in a 2-stage call initiation (First: Dialing, Second: Speaking), By design, the illustration in FIG. 1 does not necessarily depict photos, videos, or other metadata, but various embodiments can include such various inputs indicative of the caller or calling party attempting to reach the called party.

FIG. 2 provides a flow chart of individual steps that lead to the delivery of a voice audio clip to party B interleaved with ringing and caller ID display.

Example embodiments of the present invention are described herein in the context of systems, methods and computer program products for obtaining, recording, transporting, and playing back audio clips of a short duration (e.g. 5 sec). A telephony subscriber in the process of making a call may be prompted to provide a voice audio clip destined for the called party (203). The resulting audio clip may be stored either on the caller's device or in computer memory of a switching system. Telephony protocols and signaling technologies are modified to transport (209,210) the voice audio clip to the called party during the call setup phase. Upon receiving the audio clip, the called party may interleave ringing tones and the audio clip content during the ringing cycle (212) of the system, and in addition to the display of caller ID information (208).

In one exemplary embodiment, the voice audio clip may be obtained from the caller of a telephone call (203). After the caller has input the destination telephone number and after validation of the number by the switching systems (202) the caller may be prompted to submit an audio clip intended for the called party (203). The clip may be temporarily stored in local memory of the device or in computer storage memory of the switching systems or in a dedicated adjunct server.

In one exemplary embodiment, when the destination device (at the called party) or an access system for the destination device is instructed to initiate a ringing cycle, a new telephony protocol element (message or signal) may inform the destination device or its access system that an audio clip is waiting to be delivered to the destination device (207). In response, the destination device or its access system may initiate a transport connection (209) to the calling device or to the system where the audio clip is stored and receive the clip over the established transport connection (210). Upon receiving the audio clip the destination device or its access system may replay the clip repeatedly as an alias for the ringtone or may replay the clip and interleaved with the ring tone until the called party answers or rejects the call.

In one exemplary embodiment, the maximum duration for the voice audio clip may be administrable.

Some embodiments can include methods, systems, and apparatus, including computer programs encoded on a computer storage medium, for collecting and transporting a voice audio clip of a telephony caller acquired at the time of initiating a telephone call, and playing the voice audio clip at the called party's communication device before the call is answered or interleaved with a ringing tone and in addition to caller-ID notification, including:

a. Updating telephony signaling and packet protocols for notification, collection, and transport of telephony caller originated voice audio clip(s).

b. Storing telephony caller originated voice audio clips at the caller's communication device or at a component of the connecting switching systems c. Updating telephony operational procedures for the establishment of a communication session with the originator of a telephone call to obtain a voice audio clip.

d. Updating telephony operational procedures for retrieval and transport of a caller originated voice audio clip.

e. Updating telephony procedures for the replay of a voice audio clip at the communication device of a called party.

f. Modifying the ringing operation at the called party device or its access system to receive a voice audio clip without a ringing tone in a repeating cycle until the associated call is answered or rejected.

g. Modifying the ringing operation at the called party device or its access system to interleave a received voice audio clip with a ringing tone in a repeating cycle until the associated call is answered or rejected.

Some embodiments include methods, systems, and apparatus, including computer programs encoded on a computer storage medium, for collecting and transporting a voice audio clip of a telephony caller acquired at the time of initiating a telephone call, and transporting a still photo and or video at the called party's communication device before the call is answered or interleaved with a ringing tone and in addition to caller-ID notification, comprising:

a. Updating telephony signaling and packet protocols for notification, collection, and transport of telephony caller originated still photo and or video clip.

b. Storing telephony caller originated still photo and or video clips at the caller's communication device or at a component of the connecting switching systems c. Updating telephony operational procedures for the establishment of a communication session with the originator of a telephone call to obtain a still photo and or video.

d. Updating telephony operational procedures for retrieval and transport of a caller originated still photo and or video.

e. Updating telephony procedures for the replay of a still photo and or video at the communication device of a called party.

f. Modifying the ringing operation at the called party device or its access system to receive a still photo and or video without a ringing tone in a repeating cycle until the associated call is answered or rejected.

g. Modifying the ringing operation at the called party device or its access system to interleave a received still photo and or video with a ringing tone in a repeating cycle until the associated call is answered or rejected.

In some embodiments, methods, systems, or devices can have a maximum duration of the voice audio clip that is administrable. The methods and systems above can also apply to packet switched or circuit switched telephony or both. In some embodiments, permission for which parties are able to update the telephony signaling and packet protocols is given automatically by an analysis of the called parties address book. In some embodiments, permission for which parties are able to update the telephony signaling and packet protocols is given manually the called party. In some embodiments depending on the characteristics of the calling ID, the call can be automatically rejected, or routed to a different number (including answer message associated with this class of caller ID). Examples of characteristics include: age, nationality/ethnicity, or temperament of the calling party.

In some embodiments a communication device can include an audible output device, a memory having computer instructions, and one or more processors operatively coupled to the memory and the audible output device. The execution of the computer instructions can cause the one or more processors to perform operations including: receiving a call from a calling party that includes caller identification information and a voice or video message associated with the caller identification information; presenting the caller identification information; and presenting the voice message or video message as an alias to a ring tone or interleaved with the ring tone before the call from the calling party is answered. In some embodiments, the communication device is a mobile phone. In some embodiments, the communication device is one among a landline phone, a desktop computer, a laptop computer, a notebook computer, a tablet computer, or a phablet computer. It can also be a smart phone, a smart watch, an earphone, or a body worn computer or wearable computing device as further defined below.

In some embodiments, the voice or video message is a recorded voice or recorded video message retrieved or obtained or recorded at the time of initiating the call to the called party by the calling party. In some embodiments, the one or more processors presents the voice message obtained at the time of initiating the call to the called party by the calling party as the alias for the ring tone presented at the audible output device for the communication device. In some embodiments, the one or more processors presents the voice message obtained at the time of initiating the call to the called party by the calling party interleaved with the ring tone presented at the audible output device for the communication device. In some embodiments, a display coupled to the one or more processors presents the video message obtained at the time of initiating the call to the called party by the calling party as the alias for the ring tone presented at the communication device when receiving the call from the calling party. In some embodiments, the audible output device and a display coupled to the one or more processors presents the video message obtained at the time of initiating the call to the called party by the calling party interleaved with the ring tone presented at the communication device.

In some embodiments, the communication device further includes a display coupled to the one or more processors wherein the video message is a photograph taken (or retrieved or otherwise obtained) at the time of initiating the call to the called party by the calling party which is presented as the alias for the ring tone at the communication device when receiving the call from the calling party. In some embodiments, the communication device further includes a display coupled to the one or more processors wherein the recorded video message is a photograph retrieved or obtained or taken at the time of initiating the call to the called party by the calling party which is presented with the ring tone at the communication device in a repeating cycle when receiving the call from the calling party until the call is answered or rejected.

In some embodiments, the one or more processors analyze the characteristics of the caller identification information and the voice message or the video message and routes the message based on the analysis.

In some embodiments, a method at a communication device can include receiving a call from a calling party that includes caller identification information and a voice or video message associated with the caller identification information; presenting the caller identification information via a presentation device operatively coupled to the communication device; and presenting via the presentation device the voice message or video message as an alias to a ring tone or interleaved with the ring tone or presented with the ring tone in a repeating cycle until the call from the calling party is answered or rejected. In some embodiments, the presentation device is a speaker, a display, or both. In some embodiments, the voice or video message is retrieved or recorded or otherwise obtained at the time of initiating the call to the called party by the calling party.

In some embodiments, the method presents the voice message retrieved or recorded or otherwise obtained at the time of initiating the call to the called party by the calling party as the alias for the ring tone presented at the presentation device for the communication device. In some embodiments, the method presents a voice message obtained at the time of initiating the call to the called party by the calling party interleaved with the ring tone or presented in the repeating cycle at the presentation device for the communication device. In some embodiments, the method analyzes the characteristics of the caller identification information and the voice message or the video message and routes the message based on the analysis.

In some embodiments, a system for communicating with a communication device that presents a ring tone and caller identification information includes a memory having computer instructions and one or more processors operatively coupled to the memory. The execution of the computer instructions causes the one or more processors to perform operations including originating a call from a calling party to a called party that includes caller identification information and a message having a voice message, or video message or photograph associated with the caller identification information obtained at a time of the call origination; and transmitting the caller identification information and the message to the called party for presentation at the communication device of the called party. In some embodiments, the caller identification information and the message is presented at the communication device of the called party as an alias to the ring tone or interleaved with the ring tone or presented with the ring tone in a repeating cycle until the call from the calling party answers or rejects the call. In some embodiments, the system is a telephone communication system for a landline or a mobile phone. In some embodiments, the one or more processors analyze the characteristics of the caller identification information and the message and routes or rejects the message based on the analysis.

The system can be housed in any type of Wearable/Body-Borne computing. The system can further represent a single device or family of devices configured in a master-slave, master-master arrangement for example in an smartphone, smart watch or optical head-mounted display connected physically, optically or wirelessly to a either another Wearable/Body-Borne computer or an earpiece that may or may not contain a microphone or bone conduction pickup. A few definitions follow below.

Wearable and Body-Borne Computing can include: The field of wearable computing, however, extends beyond devices worn only outside the body. "Body-Borne Computing" or "wearable computing" is used as a substitute for "Wearable Computing" so as to include all manner of technology that is on or in the body, e.g. implantable devices as well as portable devices like smartphones.

A term that refers to computer-powered devices or equipment that can be worn by a user, including clothing, watches, glasses, shoes and similar items. Wearable computing devices can range from providing very specific, limited features like heart rate monitoring and pedometer capabilities to advanced "smart" functions and features similar to those in smartphones, smart watches, optical head-mounted displays and helmet-mounted displays. These more advanced wearable computing devices can typically enable the wearer to take and view pictures or video, hear audio signals, read text messages and emails, respond to voice commands, browse the web and more.

Acoustic transducers can include: acoustic, bone conduction, transdermal, magnetic, optical, Electromagnetic Acoustic Transducer (EMAT), Piezoelectric, Magnetostrictive transducers. These transducers in general can either make contact or be used in a non-contact arrangement such as with omnidirectional Transducers or directional transducers).

Microphones constitute: An acoustic-to-electric transducer or sensor that converts sound or vibrations into an optical or electrical signal. Microphones use electromagnetic induction (dynamic microphone), capacitance change (condenser microphone), piezoelectric generation, or light modulation to produce an electrical voltage signal from mechanical vibration. Microphones can also include an ear canal microphone, which is capable of capturing a voice directly from the user ear canal. These are often referred to as bone conduction microphones.

Bone conduction is the conduction of sound to the inner ear through the bones of the skull. Bone conduction transmission can be used with individuals with normal or impaired hearing.

Earphones can include: Earphones, canal phones, and headphones that can be mono or stereo as well as binaural. In addition, the term applies to hearing aids such as Behind The Ear (BTE devices). Earphones can also indude in Concha, inn Canal or personal sound amplification products or PSAP's (assisted listening devices). An Earphone may also be considered an electrode array, which is a group of electrodes that collects the impulses from the stimulator and sends them to different regions of the auditory nerve.

A Gateway MSC or MSC is a mobile switching center that receives incoming calls from other carriers for a specific group of dialed Mobile Dialing Numbers (MDNs) that the wireless carrier hosts. Dialed MDNs that are not specific to a wireless carrier (e.g. they have been ported via the Number Portability (NP) database) are assigned an LRN (Location Routing Number) that is specific to the ported-to wireless carrier's MSC. A Gateway MSC is responsible for locating the dialed MDN and obtaining its International Mobile Subscriber Identity (IMSI) by query to the Home Location Register/Home Subscriber Server (HLR/HSS) and then completing the call as directed by the services identified in the HLR (including voice paging).

HLR is the Home Location Register that stores subscriber information (e.g., what services are subscribed to by the subscriber).

HSS is a combination of HLR with authentication, authorization and accounting (AAA) for combined circuit/IP wireless networks.

The Internal Mobile network subscription identifying number (IMSI) is also known as MIN on cdma2000 networks. The IMSI Identifies the operator as well as the subscription.

A mobile directory number (MDN) is a phone number assigned to a wireless device. With number portability, this no longer directly identifies the operator.

A Network Answer is the answer signal that passes from the mobile through the network and triggers a voice path connection and usually the start of billing.

Signaling System 7 or SS7 is the internal telecom signaling network used in both wireline and wireless systems. SS7 is similar in concept to IP. Note that often SS7 runs over IP instead of the SS7 physical layer.

User Answer: If a call is auto-answered, an "Answer" button can be presented to the user to trigger an action that simulates a network answer (even though that has, without the knowledge of the user, already occurred.)

A voice page or VPG is a voice recorded from the calling party that is delivered to the terminating party (or called party) in real time before the User (or called party) answers.

A Voice Page List or VPL is a list of voice pages and meta-data, similar to a list of text messages.

In some embodiments, some of the elements of a real-time voice paging service are incorporated into the concept of the ring tone alias. In some of the basic embodiments, the caller can be prompted to start talking while the phone at the number they dialed has just started ringing. The voice is played through to the called party (or terminating party), for a limited time, and the terminating party has the option to answer the call, disconnect, divert to voice mail or simply wait for the time limit of the message, at which point normal no-answer handling will occur.

Possible delivery and signaling methods include the following:
  a. 1. App-to-App. Both originating and terminating party have downloaded an App for this feature. See FIG. 3C.
  b. 2. Gateway with IP delivery. The terminating mobile's operator has a gateway with both circuit switched and IP connections. Voice paging and signaling are transmitted over IP. The terminating party has an App to control call processing within the device. See FIG. 3B.
  c. 3. Gateway with Circuit delivery. The terminating mobile's operator has a gateway with only circuit switched connections. Voice pages are delivered over the circuit connection. Signaling may be via tones or by indirect triggering of SS7 messages. See FIG. 3A.
  d. 4. Text to voice in phone. Text messages received by the App in the phone are converted to voice.
  e. 5. Text to voice in the SMSC. The terminating party's SMSC converts an SMS message from text to voice and delivers the voice over an IP connection.

Methods for controlling service possibly include:
  a. 1. If the service involves the terminating party's wireless operator then they will have overall control over the service based on subscription by a customer.
  b. 2. The terminating party will have an On/Off switch for the service.
  c. 3. In the App-to-App version, the originating party will also be able to turn the service off or on.
  d. 4. The service can be turned on automatically when the speed of the party is greater than a set amount.
  e. 5. The service can be automatically turned off if the ringer is set to silent or vibrate without a headphone connected.
  f. 6. The service can be automatically turned off based on roaming information (e.g. outside home carrier, outside home country).
  g. 7. The service, if turned off, can be turned on for one call by an additional button for an incoming call (along with the normal buttons to accept or reject the call).

Feedback to the Caller

The feedback to a calling party can be given at various levels based on knowledge of the calling party number and the number of previous times they have invoked the service. For unknown parties and those who have never previously invoked the service, a lengthy introduction can be given. For those who have called a few times a shorter message can be given. For those who have called many times no message will be given but, in all cases, a special tone will be played. The messages can be similar to:
  a. 1. "Please let <name recorded at setup> known why they should answer this call. They will hear you as you talk for up to <time limit> seconds and they may answer the call if it is safe to do so."
  b. 2. "Leave a voice page for <name recorded at setup>".

This message can be provided in the preferred language(s) of the called party that are supported by their wireless carrier (e.g. English and Spanish in the US, English and French in Canada).

In addition, while the caller is talking, a ring-back tone can be played faintly during the voice paging phase. If the call transfers to voice mail, this will stop. Frequent callers will soon realize the significance of this.

Actions by and Signals from the Terminating Party

The terminating party may take one of several actions during voice paging, and each will generate different signals. The word "button" could refer to any user interface object, including gestures or voice commands.

Answer

Even if the call is auto-answered, the user will still believe the call is unanswered. If the "answer" button is pressed the RAN will be informed that the call is answered (if not already done) and a special signal will be sent to either the originating App or the Gateway via IP, a feature code (e.g. *123) or by tones (MF or DTMF). This will stop recording of the voice page as the call is now connected normally.

The voice page would normally be discarded at this point (as the terminating party has the opportunity to get the caller to repeat anything they missed), although an option could be provided to retain the recording.

Disconnect/Divert

This will signal the network to reject the call. In the App-to-App version a signal will be sent to the originating App to stop the transmission of voice packets.

The voice page would normally be discarded at this point (as the terminating party is probably not interested in the call), although an option could be provided to retain the recording.

The network may well invoke Call-Forward-No-Answer or diversion to Voice Mail in response to this. If the terminating party's operator is providing the service, coordination with voice mail can be smoother.

Do Nothing:

If the terminating party does nothing, the forwarding of voice packets will cease after a timeout, along with the provision of muted ringback to the caller. The caller may be routed to voice mail immediately or, in the App-to-App case, after an independent call-forward-no-answer timer expires.

The terminating party's mobile will store the voice page in a list, similar to the storage of incoming text messages, where they can be later played back. Each voice page will be annotated with available information on the calling party, time and duration.

Identified Issues with App-to-App Version

In the App-to-App version diversion to voice mail occurs independently of the App. Therefore, if the voice paging timer is set too long, diversion to voice mail could occur before the voice paging is completed, which would be confusing and annoying.

In the App-to-App version there needs to be a method to convert from a phone number (MDN) to an IP address. The easiest way is to have a "Service Box" with a known domain name/IP address in the network where all downloaded Apps can register their associated MDN (external phone number) and IMSI (wireless network identifier). This introduces security issues (e.g. spam to people with known MDN).

The voice call (unanswered at the time of voice paging) and the voice paging must be synchronized. A positive signal from the terminating app must be received before voice pages are transmitted. The Terminating Mobile must verify that the incoming call matches (e.g. via calling number ID) the voice paging information. This may require calling number id.

Identified Issues with Gateway Version:

Signals need to be sent from the terminating party back to the gateway (e.g. Reject, User Answer). A simple, old fashioned approach (given that reverse audio is not yet cut through) is to use MF/DTMF tones. This avoids the issues with setting up an IP connection (such as addressing). Another approach would be the use of feature-codes (e.g. *123) however this introduces potential incompatibilities such as systems not always sending the signal back to the HLR, use of the same signal by another service, and so on.

Auto-answer starts the billing clock. However, the operator is in charge of the call and can decide whether billing starts at this point, or with user answer. For many users with unlimited, or almost unlimited, voice plans, this would not be a big issue. For budget conscious users it could be.

The "DB" used by the Gateway MSC could be the Number Portability database, the HLR/HSS or, the Gateway MSC and Media GW could be the same device. The best method for this requires further investigation and may differ between operators and infrastructure vendors.

Additional Features

A means to retract the acoustic (voice) page

A means to process with acoustic (voice) page utilizing time compression while preserving original pitch.

A means to interface with Social Media thus a tweet, Facebook, Google+ or other can be acoustically played on the mobile phone. A TTS engine would then convert the Social media text.

A means to interface with email thus sender of an email or other can be acoustically played on the mobile phone. The email would be converted by a TTS engine.

A means to interface with email thus sender of an text or other can be acoustically played on the mobile phone. The text would be converted by a TTS engine.

A means to interface for an "Amber" alert whereas the alert can be acoustically played on the mobile phone. The alert would be converted by a TTS engine.

A means to wake up the phone and for the voice paging system to be heard if phone was off or if ringer was off or in DND mode A means for the voice paging platform to begin playing the message with a lower volume than the final volume, thus not to cause interruption during a users meeting. The volume could continue to rise during the voice page sequence.

A means for the rules on the called party device to allow specific users to utilize voice paging for any feature such overriding DND, Volume off as well as turn on phone.

A means to activate the phones microphone to automatically be enabled so the calling party could hear the called party even though the called party has not answered the phone.

FIG. 3A illustrates the voice and signal paths in a gateway circuit method 300 wherein a mobile subscriber unit 302 originates a call and connects with an serving MSC 308 via an originating MSC 304 and a Gateway MSC or mobile gateway 306. The gateway 306 can prompt the caller to leave a page and can also provide a muted ringback in the case the calling party does not answer the page. When a live or "real-time" paging signal is being provided by the serving MSC 308 to the called party at device 310, the device 310 can automatically answer back to the serving MSC 308. Note that voice pages are delivered over a circuit connection and signaling may be via tones or by indirect triggering of SS7 messages.

Figure 3B:
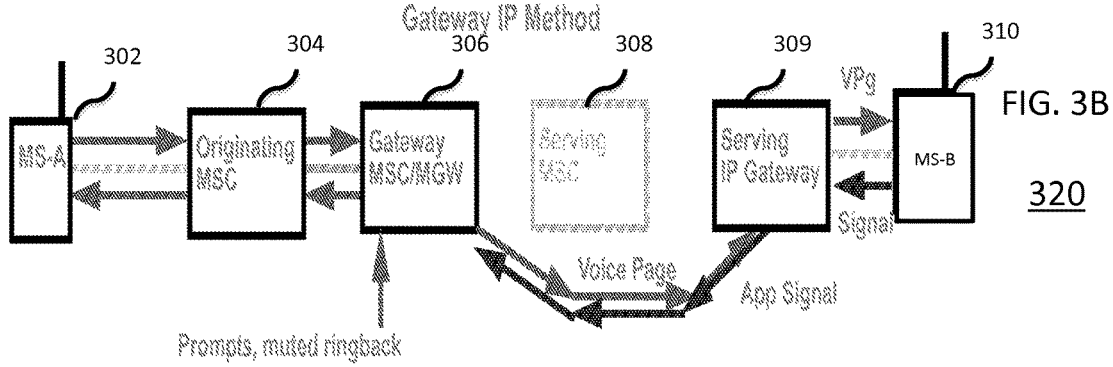
FIG. 3b depicts the voice and signaling paths for a gateway Internet Protocol (IP) method in accordance with an embodiment.

FIG. 3B illustrates the voice and signal paths in a gateway IP method 320 where a mobile subscriber unit 302 originates a call and connects with an serving IP gateway 309 (and bypassing a serving MSC 308) via an originating MSC 304 and a Gateway MSC or mobile gateway 306. The gateway 306 can prompt the caller to leave a page and can also provide a muted ringback in the case the calling party does not answer the page. When a live or "real-time" paging signal is being provided by the serving IP gateway 309 (via the gateway 306) to the called party at device 310, the device 310 can signal back to the serving IP gateway 309 (to the gateway 306, the originating MSC 304 and mobile subscriber unit 302. The terminating mobile's operator can have a gateway with both circuit switched and IP connections. Voice paging and signaling are transmitted over IP. The terminating party has an App to control call processing within the device.

Figure 3C:
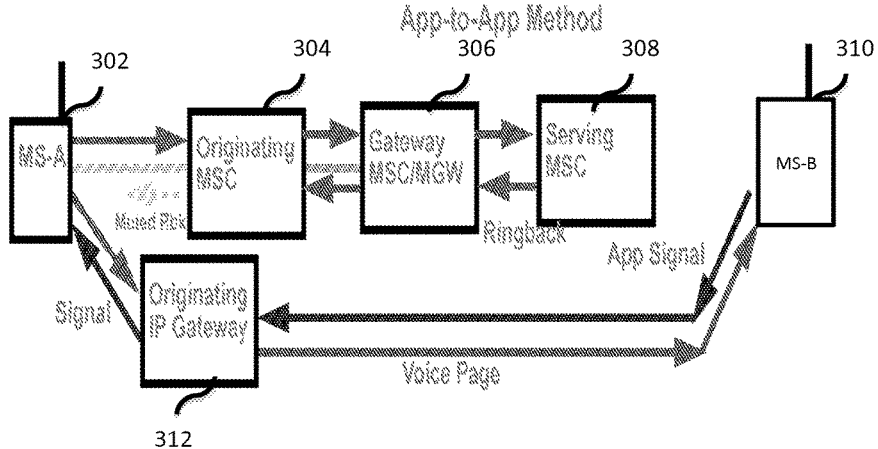
FIG. 3c depicts the voice and signaling paths for an application to application or App-to-App method between mobile phones in accordance with an embodiment.

FIG. 3C illustrates the voice and signal paths in a App-to-App method 330 where both originating and terminating party have downloaded an App for this feature and where an originating IP gateway 312 forwards the voice page from the originating mobile unit 302 to the terminating mobile unit 310. The originating IP gateway 312 also serves to send an App signal back from the terminating mobile unit 310 to the originating mobile unit 302.

Figure 4:
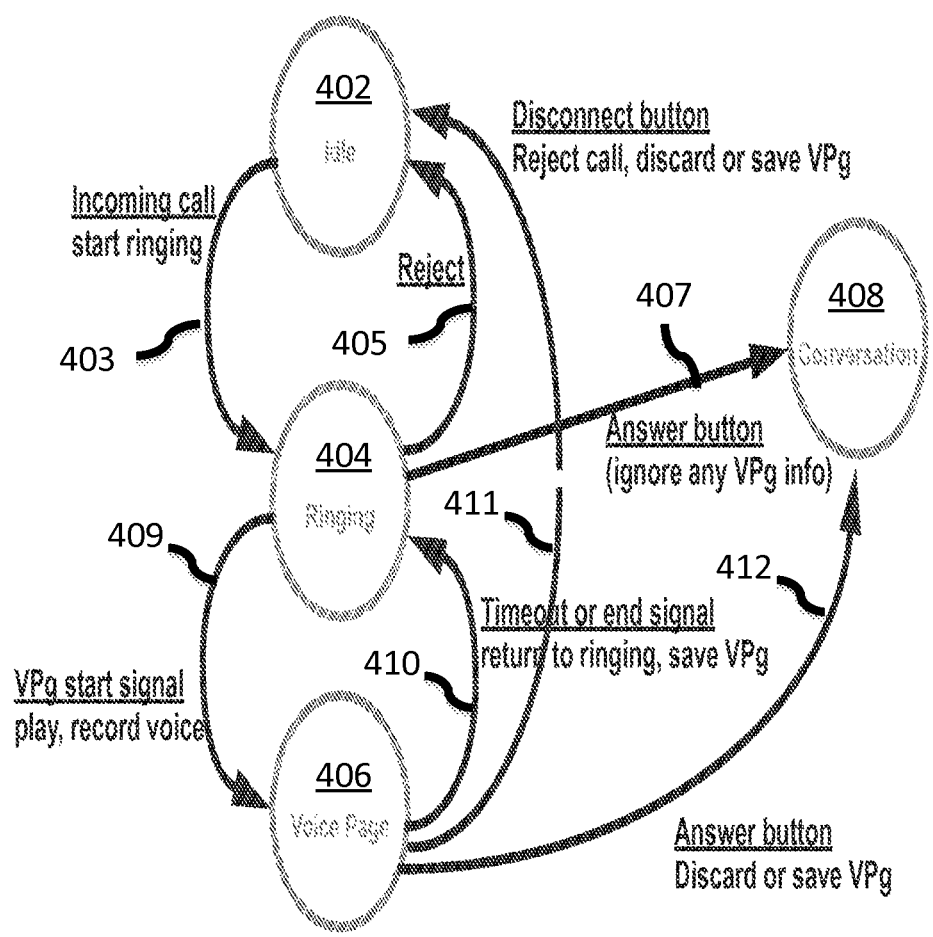
FIG. 4 illustrates a state chart for a terminating mobile device (for the called party) in accordance with an embodiment.

FIG. 4 illustrates the state diagram 400 of a terminating mobile device (such as mobile device 310 in FIGS. 3A-3C) in various embodiments. At state 402, the terminating device is idle, at state 404 the device is ringing, at state 406, the device is receiving a voice page, and at state 408 the terminating device can be in a live conversation with the originating device. When the terminating device is idle at 402, the device can receive at 403 an incoming call causing the device to go into the ringing state 404. If the device at ringing state 404 rejects at 405 the incoming call, then the device returns to the idle state 402. If the terminating device at 407 answers the incoming call (by selecting an answer button for example) before a voice paging signal starts (at 409), then the terminating device enters into a conversation and into the conversation state 408 and can ignore any voice paging information. If the call is not rejected at the ringing state 404 and not answered before the voice paging signal starts, then the voice paging signal starts at 409 and the terminal device enters the voice page state 406. In the voice page state 406, if the device at 410 times out or receives an end signal, then the terminating device returns to the ringing state 404 and causes the device to save the voice page message left by the calling party. In the voice page state 406, if the device at 411 gets a disconnect or reject signal (via a disconnection button for example), then the terminating device returns to the idle state 402 and the call is rejected and the voice paging message left by the calling party is either discarded or saved. In the voice page state 406, if the device at 412 answers the call (after the voice paging signal starts at 409), then the terminating device enters into the conversation state 408 and the voice paging message left by the calling party can either be discarded or saved.

Figure 5:
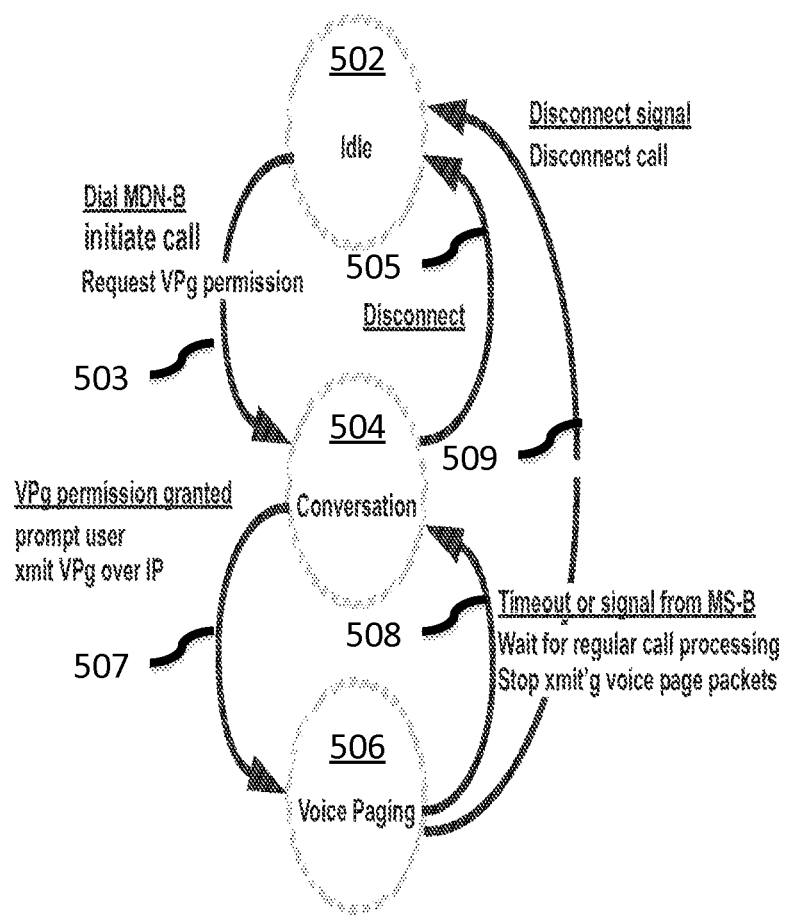
FIG. 5 illustrates a state chart for an originating mobile device (for a calling party) in accordance with an embodiment.

FIG. 5 illustrates the state diagram 500 of an originating mobile device (such as mobile device 302 in FIGS. 3A-3C) in various embodiments using an App-to-App arrangement. At state 502, the originating device is idle, awaiting the initiation of a call at 503 that would dial a terminating mobile device using a mobile directory number "B" that would further request permission for voice paging. Upon initiation of the call at 503, the originating device enters into a conversation state 504. If the call is disconnected at 505 during the conversation state 504, then the device returns to the idle state 502. If during the conversation state 504, the device is granted permission for voice paging at 507, the device prompts the user or the originating device to transmits a voice page over an IP network and enter a voice paging state 506. During the voice paging state 506, if at 508 a time out is reached or a signal is received from the terminating device to wait for regular call processing, then the originating device stops transmitting (or receiving) voice paging packets and enters into the regular conversation mode or state 504. While in the voice paging state 506, if the originating device receives at 509 a disconnect signal, then the call is disconnected and the originating mobile device returns to an idle state at 502.

Figure 6:
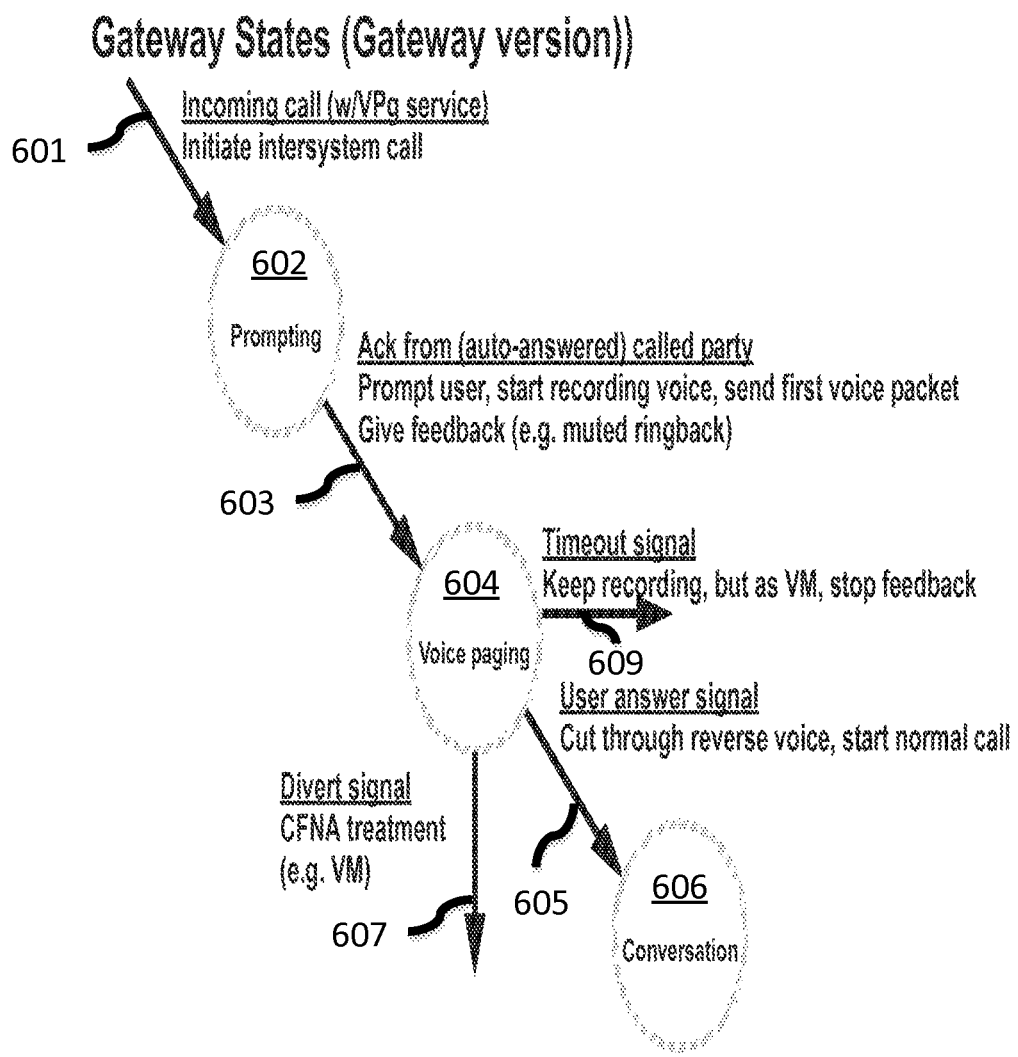
FIG. 6 illustrates a state chart for a gateway in accordance with an embodiment.

FIG. 6 illustrates the state diagram 600 of a gateway device (such as gateway device 306 in FIGS. 3A and 3B) in various embodiments. The gateway device enters a prompting state 602 when receiving an incoming call from a calling (or originating) party with a voice paging service request at 601 that initiates an intersystem call. If an appropriate acknowledgement is automatically received from the called (or terminating) party, the calling party is prompted to start a voice paging message 603 and recording of voice and transmission of voice paging packets are sent and feedback can be given back to the calling party (in the form of a muted ringback for example) as the gateway enters a voice paging state 604. In the voice paging state 604, if the "answer" button is pressed at 605, the radio access network (RAN) will be informed that the call is answered (if not already done) and a special signal will be sent to the Gateway. This will stop recording of the voice page as the call is now connected normally in the conversation state 606. The voice page would normally be discarded at this point (as the terminating party has the opportunity to get the caller to repeat anything they missed), although an option could be provided to retain the recording. In the voice paging state 604, if a timeout signal is received at 609 where the terminating party does nothing, the forwarding of voice packets will cease after a timeout, along with the provision of muted ringback to the caller. The caller may be routed to voice mail immediately or, in the App-to-App case, after an independent call-forward-no-answer timer expires. The terminating party's mobile can store the voice page in a list, similar to the storage of incoming text messages, where they can be later played back. Each voice page will be annotated with available information on the calling party, time and duration. In the voice paging state 604, if the gateway receives a divert signal at 607, the network and gateway can invoke a Call-Forward-No-Answer or diversion to Voice Mail in response to the divert signal. If the terminating party's operator is providing the service, coordination with voice mail can be smoother.

Figure 7:
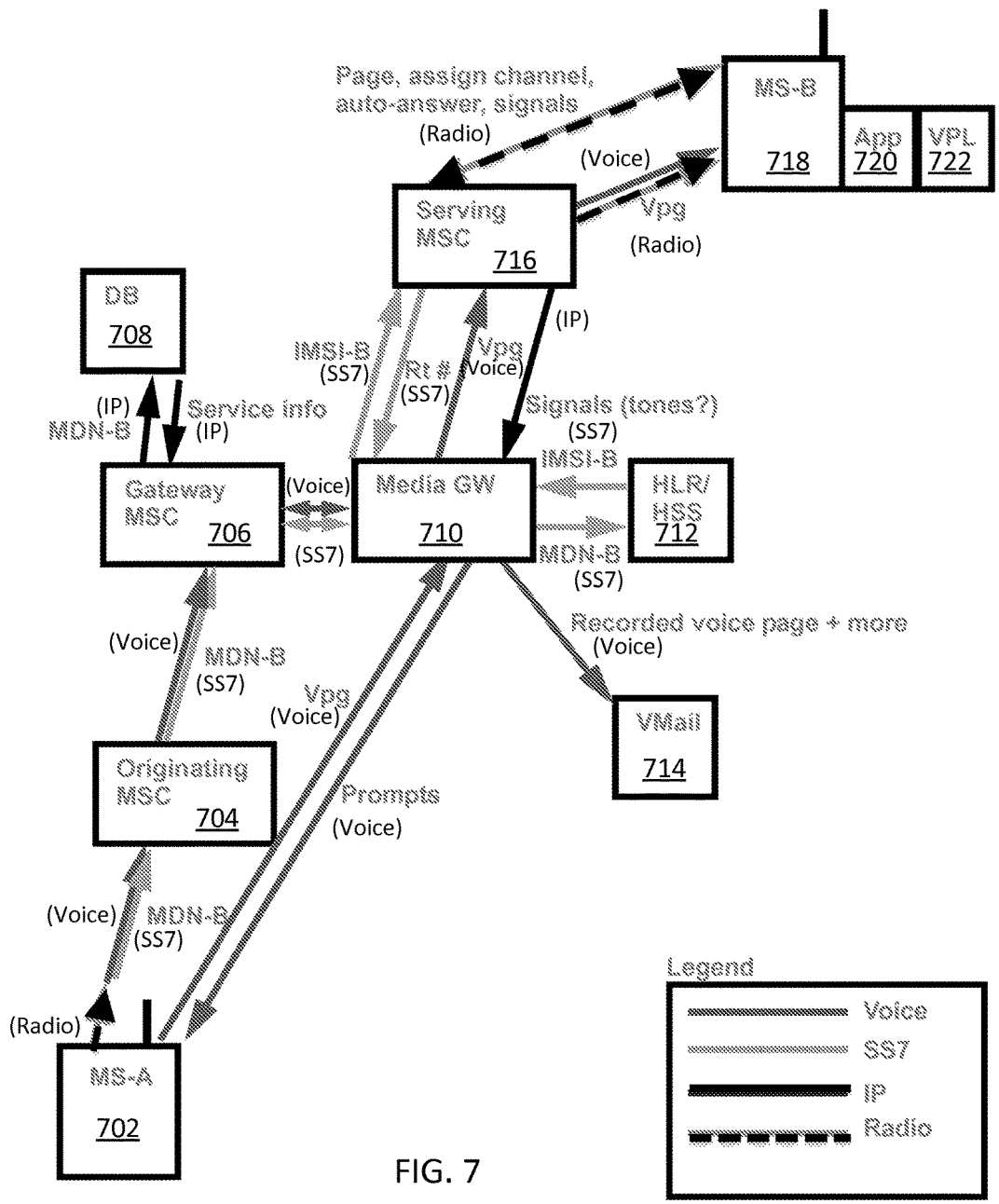
FIG. 7 depicts a flow chart of delivery of information in a scenario with real-time voice paging voice augmented caller ID using a gateway with circuit delivery in accordance with an embodiment.

FIG. 7 illustrates a signaling flow chart in a communication system 700 that includes real-time voice paging voice augmented caller id or a ring tone alias using a gateway mobile switching center 706 and a media gateway 710. Such a system includes a number of components communicating over various links over various communication protocols. System 700 can include an originating or calling party mobile subscriber unit 702 (MS-A) communicating with a called or terminating party mobile subscriber unit 718 (MS-B) via several gateway devices (706 or 710) depending on the type of communication being sent or received. Note that the various communication protocols being used in this embodiment include voice paging, SS7, IP, and radio communication protocols. The calling party unit 702 can initiate a call to the called party unit 718 using both voice and SS7 signaling to the gateway MSC 706 via an originating MSC 704. The Gateway MSC 706 accesses a database 708 using the IP protocol to retrieve service information for the called party unit 718. The gateway MSC 706 communicates (using voice and SS7 signaling) with the media gateway 710 and informs the media gateway 710 that a voice paging type of call needs to be processed and the media gateway 710 proceeds to prompt the calling party unit 702 to provide a voice page. The Gateway MSC 706 also queries a HLR/HSS 712 via the media gateway 710 as necessary using SS7 signaling. The Media gateway 710 communicates with the called party unit 718 via a servicing MSC 716 using a number of protocols as shown including SS7 signaling (to and from the media gateway 710 and Serving MSC 716), voice paging signaling (from media gateway 710 to serving MSC 716 and from serving MSC 716 to the called party unit 718), IP protocol signaling (from serving MSC 716 to media gateway 710), and over the air radio protocols between the serving MSC 716 and the called party unit 718. The called party unit 718 can include one or more applications 720 and a voice paging list 722. The media gateway also communicates with a voice mail server 714 to record and store voice page messages and other meta-data.

Figure 8:
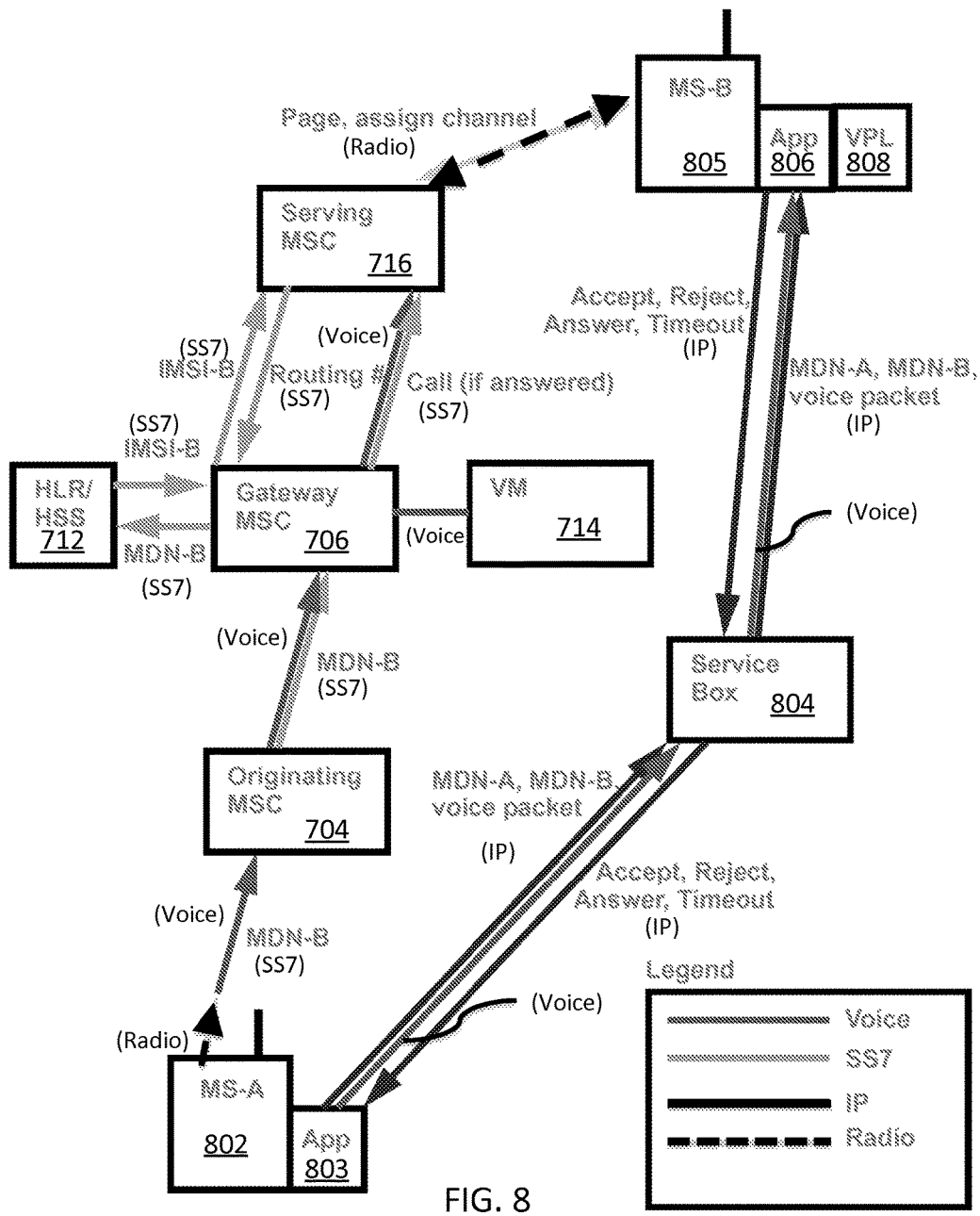
FIG. 8 depicts a flow chart of delivery of information in a scenario with real-time voice paging voice augmented caller ID using an App-to-App feature in accordance with an embodiment.

FIG. 8 illustrates a signaling flow chart in a communication system 800 that includes real-time voice paging voice augmented caller id or a ring tone alias using a App-to-App communication process for transmitting and receiving voice paging information between a calling (or originating) party unit 802 having a paging app 803 and called (or terminating) party unit 805 having a similar paging app 806. The called party unit can also include a voice paging list 808. Although the system 800 uses a gateway MSC 706 that likely belongs to a carrier, the system 800 does not generally use the carrier's infrastructure to send and receive voice paging information between the calling party unit 802 and the called party unit 805. Instead, voice paging packets using voice and other data using IP protocol are sent to from the app 803 of the calling party unit 802 to the app 806 of the called party unit 805 via a service box 804 as shown. The signaling using the IP protocol between the app 803, service box 804, and app 806 can include information for accepting a prompt for a voice page, rejecting a call, answering the call or for processing a timing out of the paging process.

System 800 can include some of the same infrastructure components found in system 700 of FIG. 7 to process calls between wireless units and forward to voice mail. For example, system 800 can include the originating or calling party mobile subscriber unit 802 (MS-A) communicating with the called or terminating party mobile subscriber unit 805 (MS-B) via the gateway MSC 706 as well as via the originating MSC 704 and the serving MSC 716. Note again that various communication protocols are used in this embodiment including voice paging, SS7, IP, and radio communication protocols. The Gateway MSC 706 queries the HLR/HSS 712 as necessary using SS7 signaling. If calls are rejected or diverted to voice mail, then the gateway MSC 706 can communicate voice messages to the voice mail server 714.

In the App-to-App version diversion to voice mail occurs independently of the App 803 (and 806). Therefore, if the voice paging timer is set too long, diversion to voice mail could occur before the voice paging is completed, which would be confusing and annoying. As noted above, the App-to-App version can also use a method to convert from a phone number (MDN) to an IP address. The easiest way is to use the "Service Box" 804 with a known domain name/IP address in the network where all downloaded Apps can register their associated MDN (external phone number) and IMSI (wireless network identifier). This introduces security issues (e.g. spam to people with known MDN), but security measures can be taken to overcome such issues. Also note that in some embodiments the voice call (unanswered at the time of voice paging) and the voice paging should be synchronized. A positive signal from the terminating app 806 must be received before voice pages are transmitted. The Terminating Mobile 805 should verify that the incoming call matches (e.g. via calling number ID) the voice paging information. This may require calling number id.

Those with ordinary skill in the art may appreciate that the elements in the figures are illustrated for simplicity and clarity and are not necessarily drawn to scale. For example, the dimensions of some of the elements in the figures may be exaggerated, relative to other elements, in order to improve the understanding of the present invention.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A communication device, comprising:
    an audible output device;
    a memory having computer instructions; and
    a processor operatively coupled to the memory and the audible output device, wherein the execution of the computer instructions causes the processor to perform operations comprising:
        processing a call from a calling party that includes a real time voice paging message;
        presenting the real time voice paging message as an alias of a ring tone and by interleaving the real time voice paging message with the ring tone such that the real time voice paging message is presented alternately with the ring tone;
        presenting an option to a called party to answer the call or ignore the call;
        presenting, in response to the call and from a device of the called party, feedback intended for the calling party, wherein the feedback is based on a quantity of times a real time voice paging messaging service associated with the real time voice paging message has been invoked; and
        continuing a conversation initiated by the real time voice paging message in response to a selection of the option to answer the call.

2. The communication device of claim 1, wherein the communication device is a mobile phone and the processor causes the communication device to receive the call from the calling party including a caller identification information and the real time voice paging message associated with the caller identification information and the processor causes the communication device to present the caller identification information.

3. The communication device of claim 1, wherein the communication device is one among a landline phone, a desktop computer, a laptop computer, a notebook computer, a tablet computer, a Voice over Internet Protocol phone, a phablet computer, an earphone, a headphone, a smartphone, or a device mounted in or on or operatively coupled to a watch, a pair of glasses, a shoe, a head-mounted display, a helmet mounted display or a wearable computing device operatively coupled to one or more of the aforesaid items.

4. The communication device of claim 1, wherein the real time voice paging message is recorded at a time of initiating the call to the called party by the calling party.

5. The communication device of claim 1, wherein the processor presents the real time voice paging message recorded at a time of initiating the call to the called party by the calling party as the alias for the ring tone presented at the audible output device of the communication device, wherein the voice paging message is played at a lower volume than a final volume such that the volume rises during a voice paging sequence.

6. The communication device of claim 1, further comprising an indicator indicating a live voice conversation is ready to ensue when the call is answered.

7. The communication device of claim 6, wherein the indicator comprises a text message, iconic symbol, a light, a tactile alert , mechanical vibration, an auditory signal, or a combination thereof.

8. The communication device of claim 1, wherein the communication device is an earphone, headphone or earpiece configured to allow discreet audition of the real time voice paging message at the communication device.

9. The communication device of claim 1, wherein the operations further comprise presenting a still photo or a video clip along with the real time voice paging message.

10. The communication device of claim 1, wherein the operations further comprise utilizing voice paging despite the communication device being turned off, in a ringer off mode, in a do not disturb mode, or in a volume off mode.

11. The communication device of claim 1, wherein the operations further comprise receiving one or more voice paging packets from a mobile subscriber device of the calling party via an originating Internet Protocol gateway.

12. The communication device of claim 11, wherein the operations further comprise sending application signals from the communication device to the mobile subscriber device of the calling party via the originating Internet Protocol gateway in response to the receipt of the one or more voice paging packets.

13. The communication device of claim 1, wherein the operations further comprise discarding or saving the receipt of an on-going voice paging message and to enter a live conversation with a mobile subscriber device of the calling party in response to receiving an answer signal at the communication device.

14. The communication device of claim 1, wherein the operations further comprise initiating a call with a voice paging permission request and receipt of a prompt for receipt of a voice paging input in response to the voice paging permission request.

15. The communication device of claim 1, wherein the operations further comprise causing the time compression of the real time voice paging message while preserving an original pitch of the real time voice paging message.

16. The communication device of claim 1, wherein the operations further comprise creating an interface with social media that causes an acoustical output of social media text at the communication device via a text to speech engine.

17. The communication device of claim 1, further comprising a text-to-speech engine that converts a received email, a received text, a received amber alert, or a combination thereof, to an acoustic output from the audible output device of the communication device.

18. The communication device of claim 1, further comprising a microphone, and wherein the operations further comprise automatically enabling the microphone when receiving the voice paging message and enabling a mobile subscriber device of the calling party to hear audible inputs at the microphone even though the called party has not answered the communication device.

19. The communication device of claim 1, wherein the operations further comprise causing a play of the voice paging message at a lower volume level than a final volume level, wherein the volume level rises during the play of the voice paging message.

20. A communication device, comprising:
an audible output device;
a memory having computer instructions; and
a processor operatively coupled to the memory and the audible output device, wherein the execution of the computer instructions causes the processor to perform operations comprising:
processing a call from a calling party that includes a real time voice paging message;
presenting, to a called party, the real time voice paging message as an alias of a ring tone and by interleaving the real time voice paging message with the ring tone such that the real time voice paging message is presented alternately with the ring tone;
presenting, in response to the call and from a device of the called party, feedback intended for the calling party, wherein the feedback is based on a quantity of times a real time voice paging messaging service associated with the real time voice paging message has been invoked; and
ignoring the real time voice paging message and directly entering a live conversation with a mobile subscriber device of the calling party in response to receiving an answer signal at the communication device.

* * * * *